C. G. & G. T. HILTON & T. MAIN.
STAND OR SUPPORT FOR SPARE WHEELS, TIRES, AND THE LIKE.
APPLICATION FILED NOV. 11, 1909.

1,071,553.  Patented Aug. 26, 1913.

Witnesses
L. F. Brock.
M. K. Freeman

Inventors.
Charles Grant Hilton
George Tom Hilton
Thomas Main
by Chas. H. Riches
their atty.

UNITED STATES PATENT OFFICE.

CHARLES GRANT HILTON AND GEORGE TOM HILTON, OF RUGBY, AND THOMAS MAIN, OF LOUGHBOROUGH, ENGLAND, ASSIGNORS TO ROTAX MOTOR AND CYCLE COMPANY, OF LONDON, ENGLAND.

STAND OR SUPPORT FOR SPARE WHEELS, TIRES, AND THE LIKE.

1,071,553.  Specification of Letters Patent.  Patented Aug. 26, 1913.

Application filed November 11, 1909. Serial No. 527,551.

*To all whom it may concern:*

Be it known that we, CHARLES GRANT HILTON and GEORGE TOM HILTON, of 4, 5, and 6 North street, Rugby, in the county of Warwick, England, and THOMAS MAIN, of Loughborough, in the county of Leicester, England, all subjects of the King of Great Britain, have invented a Stand or Support for Spare Wheels, Tires, and the Like, of which the following is a specification.

This invention comprises a new or improved stand or support, for spare wheels, tires, and the like for use in connection with automobiles and other vehicles, and the object of the invention is to provide an adjustable means which will firmly hold the tire or wheel without the use of straps and the like, being readily adaptable to the various articles to be dealt with.

According to this invention a fulcrumed member or members are provided to co-act with a fixed standard or with each other in such a manner that the article when in position is partially or wholly encircled or surrounded thereby, the gravital effect of the supported article being utilized to obtain an automatic gripping action whereby the security devices are operated to firmly and securely support and retain the wheel or other article in position.

Figure 1:
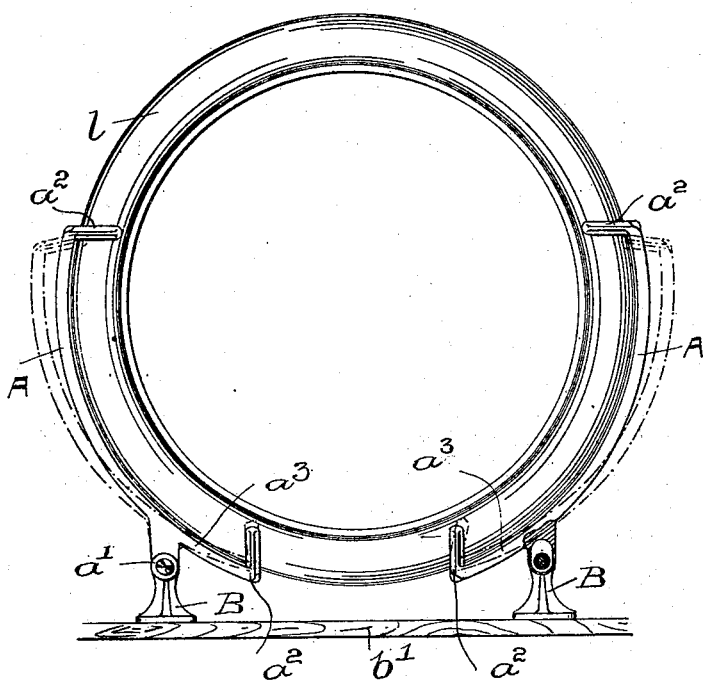
Figure 2:
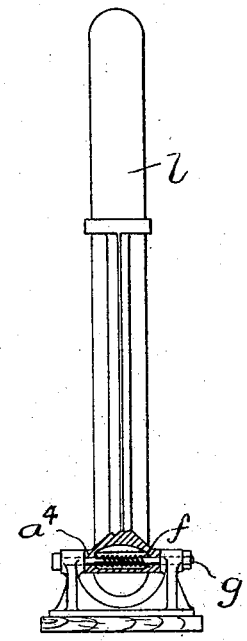
Figure 3:
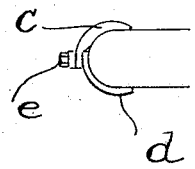
Figure 4:
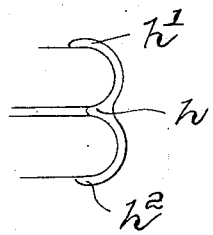

Referring to the drawings: Figure 1 is a side elevation of a stand or support constructed in accordance with the present invention. Fig. 2 is a part sectional end view of the apparatus shown in Fig. 1. Fig. 3 is a plan of a modified form of security device. Fig. 4 is a plan of a stand adapted to support two tires or wheels.

In an embodiment of this invention such as illustrated by the drawings, the dual members A are each provided with a hollow boss $a^4$ interjacent their ends, and passing through each boss $a^4$ is a pin $g$ by which the members A are pivoted or articulated to brackets B bolted or otherwise secured to the foot board $b'$ or other convenient portion of the vehicle, the configuration of each member approximating to that of the tire periphery and being preferably quadrantal. The places of articulation $a'$ may be near the lower extremities $a^3$ of the members A and for the purpose of preventing transverse movement of the supported article $l$ appropriate means such as semi-circular or arcuate bodies $a^2$ are provided, such bodies being conveniently disposed at or near the ends of the members. For cheapness of manufacture such curved bodies $a^2$ may be cast or made integral with the pivoted members A, or they may be tubular or separate therefrom and in the latter case we prefer to build the bodies from two sections $c$, $d$, which are suitably curved and secured to the members by a bolt $e$ or its equivalent passing through all three portions, such a method shown by Fig. 3 allowing of adjustment by swiveling the sections on the bolt to suit the various sizes or sections of tires, the sections $c$, $d$, during such adjustment, turning on the bolt $e$ until they are brought into proper fixed relation with the tire. A number of wheels or tires may be carried by the one apparatus, such an adaptation being shown by Fig. 4 in which a central distance projection $h$ is provided in addition to the outer ones $h'$, $h^2$.

In operation, the tire or wheel is placed on the lower portions $a^3$ of the members A and by reason of the pivotal connections the upper portions of these members are caused to swing inwardly until their motion is arrested by contacting with the tire, the resultant pressure serving to securely hold the article in position. To prevent the members A rattling at their place of articulation, an anti-rattling means such as a spring $f$ engaging the pin $g$ and boss $a^4$, may be used.

It will be readily understood that by suitably positioning the brackets supporting the members A, various diameters of wheels or tires may be accommodated by the one apparatus, while damage to the body of the car is obviated by fitting the apparatus to the foot board or other suitable part of the car.

Having now described our invention we declare that what we claim is:—

A stand for carrying spare wheels or tires comprising two oppositely arranged pivoted members, each consisting of a short arm below the pivot and a long arm above the pivot, each provided with a pair of fingers at its free end adapted to receive the tire between them, the members being of such length that the fingers of the long arms will contact with the tire above the plane of its center.

In witness whereof we have hereunto set our hands in the presence of two witnesses.

CHARLES GRANT HILTON.
GEORGE TOM HILTON.
THOMAS MAIN.

Witnesses:
WALTER H. G. BARTLOW,
WILLIAM A. DAVIS.